(12) United States Patent
Kleyman et al.

(10) Patent No.: US 10,194,072 B2
(45) Date of Patent: Jan. 29, 2019

(54) METHOD AND APPARATUS FOR REMOTE DETECTION OF FOCUS HUNT

(71) Applicant: MOTOROLA SOLUTIONS, INC, Schaumburg, IL (US)

(72) Inventors: Irina Kleyman, Wheeling, IL (US); Tyrone D. Bekiares, Park Ridge, IL (US); Hinrich A. Schmidt, Algonquin, IL (US)

(*) Notice: Subject to any disclaimer, the term of this patent is extended or adjusted under 35 U.S.C. 154(b) by 487 days.

(21) Appl. No.: 14/733,625

(22) Filed: Jun. 8, 2015

(65) Prior Publication Data

US 2016/0360090 A1    Dec. 8, 2016

(51) Int. Cl.
*H04N 5/232* (2006.01)
*H04N 1/00* (2006.01)
(Continued)

(52) U.S. Cl.
CPC ..... *H04N 5/23212* (2013.01); *H04N 1/00204* (2013.01); *H04N 1/00244* (2013.01);
(Continued)

(58) Field of Classification Search
CPC ........ H04N 5/23212; H04N 5/21; H04N 5/14; H04N 17/004; H04N 7/18; H04N 1/00244; H04N 17/002; H04N 5/77; H04N 9/8205; H04N 1/00204; H04N 5/23248; H04N 5/23254; H04N 5/23264; H04N 5/23258; H04N 5/23216; H04N 5/23287; G02B 7/38; G06T 7/13; G06T 2207/30168; G06T 7/0002; G06K 9/00771; G06K 9/6231; G06K 9/3258; G06K 2209/01; G06K 9/6256; G06K 9/66; G06K 9/18
See application file for complete search history.

(56) References Cited

U.S. PATENT DOCUMENTS 7,676,108 B2 * 3/2010 Steinberg ........... H04N 5/23212
                                                    348/208.99
8,270,751 B2 * 9/2012 Steinberg .................. G06T 7/20
                                                    348/208.99
(Continued)

OTHER PUBLICATIONS

Xhu Yun-fang—"Blur Detection for Surveillance Video Based on Heavy-tailed Distribution", College of Computer and Information Engineering, Zhejiang Gongshang University, Hangzhou, P.R. China—5 pages.

*Primary Examiner* — Dramos Kalapodas

(57) ABSTRACT

A communication system provides for automated detection, and resolution, of focus hunt. A server determines whether a predetermined number of blur metric transition (BMT) cycles, associated with a video stream, have occurred within a predetermined period of time or number of frames. In response to determining that the predetermined number of BMT cycles have occurred, the server determines that focus hunt has occurred. A BMT occurs when first and second blur metrics, determined for first and second video frames, transition from being greater than a blur metric threshold to being less than the threshold, or vice versa. In turn, a BMT cycle occurs when a BMT, of a first BMT and a second BMT, comprises a transition of blur metrics from less than the threshold to greater than the threshold and the other BMT comprises a transition of blur metrics from greater than the threshold to less than the threshold.

15 Claims, 6 Drawing Sheets

(51) Int. Cl.
*H04N 5/77* (2006.01)
*H04N 9/82* (2006.01)
*H04N 17/00* (2006.01)
*H04N 7/18* (2006.01)
*H04N 101/00* (2006.01)

(52) U.S. Cl.
CPC .............. *H04N 5/77* (2013.01); *H04N 7/183* (2013.01); *H04N 9/8205* (2013.01); *H04N 17/002* (2013.01); *H04N 2101/00* (2013.01)

(56) References Cited

U.S. PATENT DOCUMENTS

| | | | |
|---|---|---|---|
| 2004/0120598 A1* | 6/2004 | Feng | G06T 5/10 |
| | | | 382/263 |
| 2004/0150717 A1* | 8/2004 | Page | G07C 5/0891 |
| | | | 348/148 |
| 2011/0080479 A1 | 4/2011 | Trumbo et al. | |
| 2013/0182152 A1* | 7/2013 | Li | H04N 5/23212 |
| | | | 348/241 |
| 2013/0194486 A1* | 8/2013 | Shah | H04N 5/23254 |
| | | | 348/352 |
| 2014/0340566 A1* | 11/2014 | Voss | H04N 5/23212 |
| | | | 348/349 |

\* cited by examiner

METHOD AND APPARATUS FOR REMOTE DETECTION OF FOCUS HUNT

FIELD OF THE INVENTION

The present invention relates generally to video surveillance systems and, in particular, to a method and apparatus for remotely detecting focus hunt by a video camera.

BACKGROUND OF THE INVENTION

Video surveillance cameras are known to experience periodic focus thrashing, or "focus hunt," issues. Focus hunt is a condition wherein a camera continuously manipulates the focus for an extended period of time without successfully achieving a steady state condition. This is particularly common for outdoor cameras operating during nighttime hours. During such periods, cameras open their iris to allow as much light collection as possible; however, a side effect of a wide open iris is a severe reduction of a depth-of-field of the camera. Objects appearing at different focal lengths (particularly moving vehicular lights) cause the camera to thrash back and forth between two different points of focus.

For example, a focus hunting problem is described in a technical bulletin for a VG5 800 Series AutoDome camera (Technical Bulletin VG5 800 Series AutoDome CCTV, "Autofocus 'Focus Hunting,'" Oct. 25, 2012). The bulletin describes that the VG5-825 series AutoDome camera may experience issues when attempting to focus on a scene, that is, the AutoDome camera may appear to be "focus hunting," where the focus may move between the near and far focus limits. The bulletin further describes that there is no resolution for the autofocus issue that will completely eliminate the focus hunt issue and proposes that the user control focus hunting by pre-setting a time limit for how long the camera attempts to focus on a scene. Other known schemes for controlling a focus hunt issue include a user manipulating a camera position to achieve a steady focus state, for example, sending a pan-tilt-zoom (PTZ) command to re-adjust the camera's Field-of-View (FOV) to a view which doesn't trigger the focus hunt issue, adjusting a camera's iris control, enabling a camera's wide dynamic range feature, or disabling automatic focus.

Each such scheme of controlling the focus hunt issue, other than the pre-set time limit, requires that a user manually observe the occurrence of the focus hunt issue. Some large municipalities, such as the City of Chicago, are building large scale surveillance networks with tens of thousands of cameras connected to a central office. Only a small percentage of those cameras are monitored live. The cameras may be recorded for forensic purposes. Thus, while video captured from such cameras has to be of high quality, due to the size of the system any problems affecting video quality may be left undetected for long periods of time, well beyond a time when the problem initially occurs. During the time a surveillance camera is experiencing a focus hunt issue, the resulting video may be unusable for forensic purposes.

For example, FIG. 1 depicts a sequence of snapshots 102, 112, 122 from a video stream of a video camera experiencing a "focus hunting" condition. Time-wise, the snapshots occur in the order snapshot 102, snapshot 112, and then snapshot 122. In order to demonstrate the condition of focus hunting, an enlarged image 104, 114, 124 of a neon store sign is depicted with respect to each of snapshots 102, 112, and 122. As illustrated in FIG. 1, the image of the neon store sign is clearly readable when the camera is in focus (images 104 and 124) and becomes illegible when the camera goes out of focus (image 114). In the event of a focus hunt issue, the video stream may constantly and repeatedly shift between the in-focused image 104, 124 and the out-of-focus image 114, resulting in a video stream of reduced value for forensic purposes. It is easy to envision that such focus hunt issues can serve to obscure important forensic details, for example, a face or a license plate, from a video recording.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
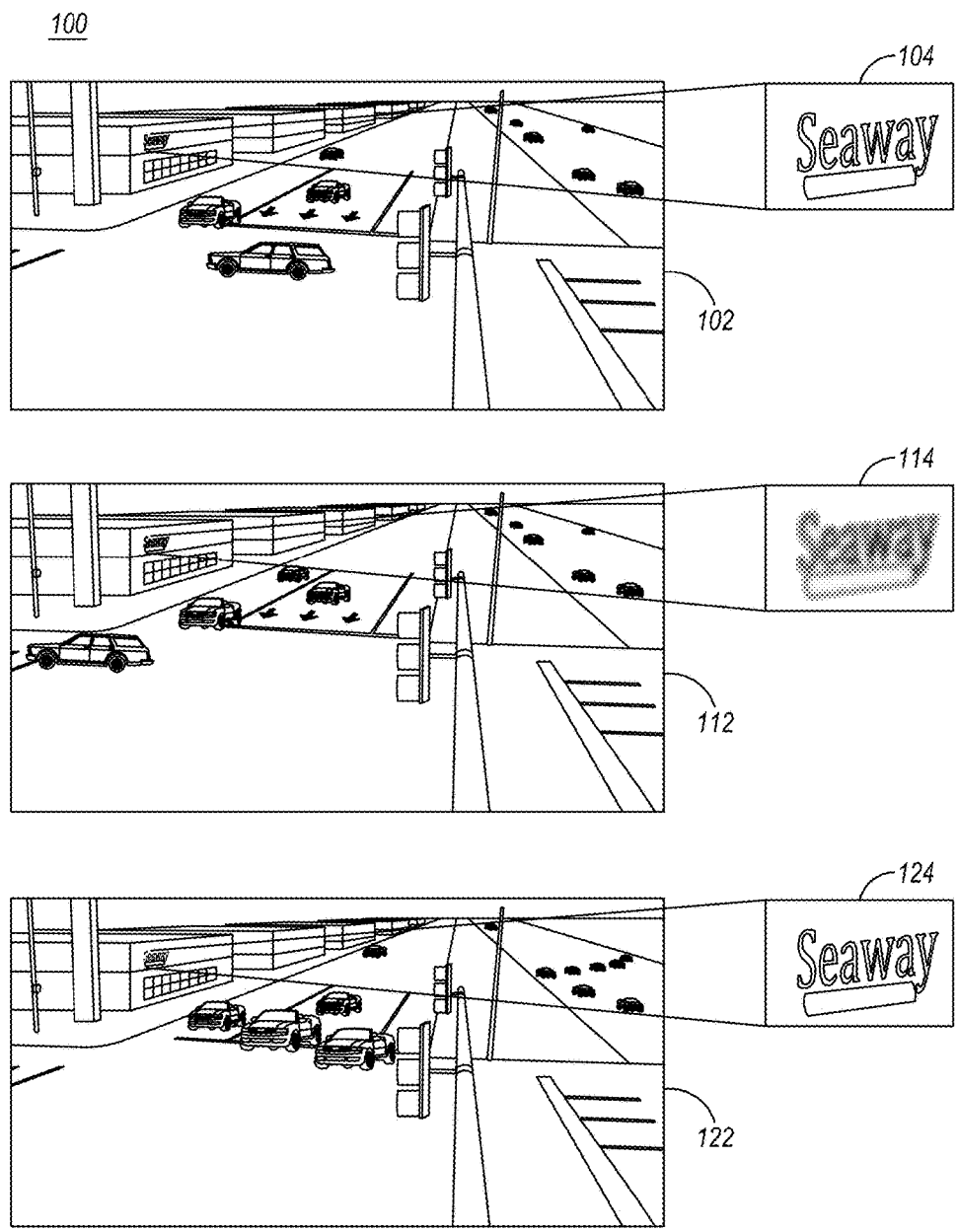
FIG. 1 depicts a sequence of snapshots from a video stream of a video camera experiencing a "focus hunting" condition.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

A communication system provides an automated analysis of a video stream to determine whether focus hunting is occurring. More particularly, a server determines whether a predetermined number of blur metric transition cycles, associated with a video stream, have occurred within a predetermined period of time or within a predetermined number of frames. In response to determining that the predetermined number of blur metric transition cycles has occurred, the server determines that focus hunt has occurred. A blur metric transition occurs when one blur metric of a first blur metric, determined for a first video frame, and a second blur metric, determined for a second video frame, is greater than a blur metric threshold and the other blur metric of the first and second blur metrics is less than the blur metric threshold. In turn, a blur metric transition cycle occurs when one blur metric transition, of a first blur metric transition and a second blur metric transition, comprises a transition from a blur metric that is less than the blur metric threshold to a blur metric that is greater than the blur metric threshold, and the other blur metric transition, of the first blur metric transition and the second blur metric transition, comprises a transition from a blur metric that is greater than the blur metric threshold to a blur metric that is less than the blur metric threshold.

Generally, an embodiment of the present invention encompasses a method for automated detection of focus hunt in association with a video stream. The method includes determining an occurrence of a plurality of blur metric transition cycles in association with the video stream, wherein determining an occurrence of each blur metric transition cycle of the plurality of blur metric transition cycles comprises: determining a plurality of blur metric transitions, wherein determining each blur metric transition of the plurality of blur metric transitions comprises determining a plurality of blur metrics in association with a plurality of video frames of the video stream, wherein a first blur metric of the plurality of blur metrics is greater than a blur metric threshold and a second blur metric of the plurality of blur metrics is less than the blur metric threshold; and wherein a blur metric transition cycle occurs wherein a first blur metric transition of the plurality of blur metric transitions comprises a transition from a blur metric that is less than the blur metric threshold to a blur metric that is greater than the blur metric threshold, and a second blur metric transition of the plurality of blur metric transitions comprises a transition from a blur metric that is greater than the blur metric threshold to a blur metric that is less than the blur metric threshold. The method further includes determining a number of blur metric transition cycles of the plurality of blur metric transition cycles that occur within a predetermined period of time or within a predetermined number of frames and determining that focus hunt has occurred based on the determined number of blur metric transition cycles.

Another embodiment of the present invention encompasses a server capable of detecting focus hunt in association with a video stream received from a remote video camera. The server includes a processor and an at least one memory device that is configured to store a set of instructions that, when executed by the processor, cause the processor to determine an occurrence of a plurality of blur metric transition cycles in association with the video stream, wherein determining an occurrence of each blur metric transition cycle of the plurality of blur metric transition cycles comprises: determining a plurality of blur metric transitions, wherein determining each blur metric transition of the plurality of blur metric transitions comprises determining a plurality of blur metrics in association with a plurality of video frames of the video stream, wherein a first blur metric of the plurality of blur metrics is greater than a blur metric threshold and a second blur metric of the plurality of blur metrics is less than the blur metric threshold; and wherein a blur metric transition cycle occurs wherein a first blur metric transition of the plurality of blur metric transitions comprises a transition from a blur metric that is less than the blur metric threshold to a blur metric that is greater than the blur metric threshold, and a second blur metric transition of the plurality of blur metric transitions comprises a transition from a blur metric that is greater than the blur metric threshold to a blur metric that is less than the blur metric threshold. The at least one memory device further is configured to store a set of instructions that, when executed by the processor, cause the processor to determine a number of blur metric transition cycles of the plurality of blur metric transition cycles that occur within a predetermined period of time or within a predetermined number of frames and determine that focus hunt has occurred based on the determined number of blur metric transition cycles.

Figure 2:
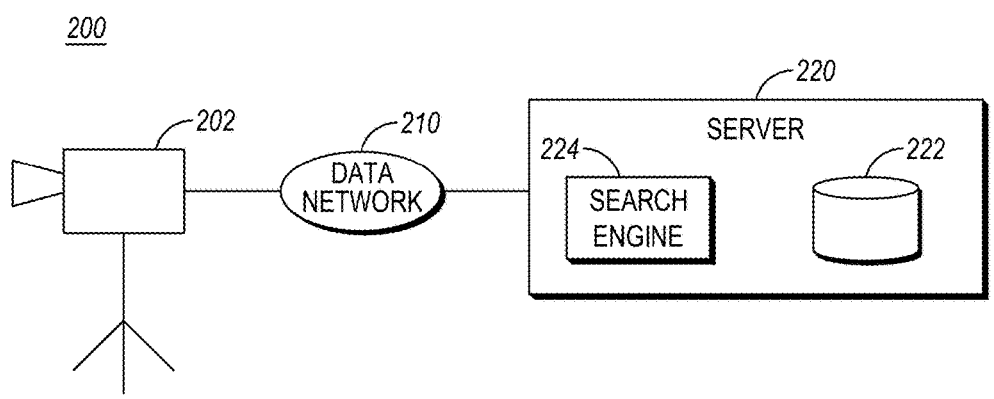
FIG. 2 is a block diagram of an exemplary communication system in accordance with an embodiment of the present invention.

Turning now to the drawings, the present invention may be more fully described with reference to FIGS. 2-7. FIG. 2 is a block diagram of an exemplary communication system 200 in accordance with some embodiments of the present invention. Communication system 200 includes one or more remote video cameras 202 (one shown) that are connected to a server 220 via a data network 210. Data network 210 may comprise a wide area network (WAN), a local area network (LAN), a telephone network such as a Public Switched Telephone Network (PSTN), the Internet, a privately operated data network such as an enterprise network, a wireless network such as a cellular network or a Wireless LAN (WLAN), a Public Safety network, or a combination of networks.

Video camera 202 is a video capture device that is capable of capturing ambient video, and optionally audio, and that may be mounted on a vehicle or on a suitable structure, such as a building or post. Server 220 may be any type of computer device that collects, logs, or records media of various modalities and intents. For example, server 220 may comprise a Records Management System (RMS) or a Content Management System (CMS) utilized by public safety agencies. Server 220 includes an at least one media storage system 222 (one shown), for example, a video storage database, that may be searched by a user. More particular, server 220 includes a server entity that may collect, process, and maintain data in media storage system 222, and further includes a search engine 224 that may search the media storage system, or other databases that may be internal or external to the server, in response to receiving a query from a user or an operator of the server. Server 220 may be connected to data network 210 via any of a wireless, wireline, or optical connection, or any other connection known in the art, and together server 220 and data network 210 may be referred to as an infrastructure of communication system 200. Media storage system 222 is a repository of media collected by video camera 202, and in particular video recordings. In other embodiments of the present invention, media storage system 222 may be external to, and in communication with, server 220. In still other embodiments of the present invention, there may be multiple media storage systems 222 (each storing different media content) external to, and in communication with, server 220.

Figure 3:
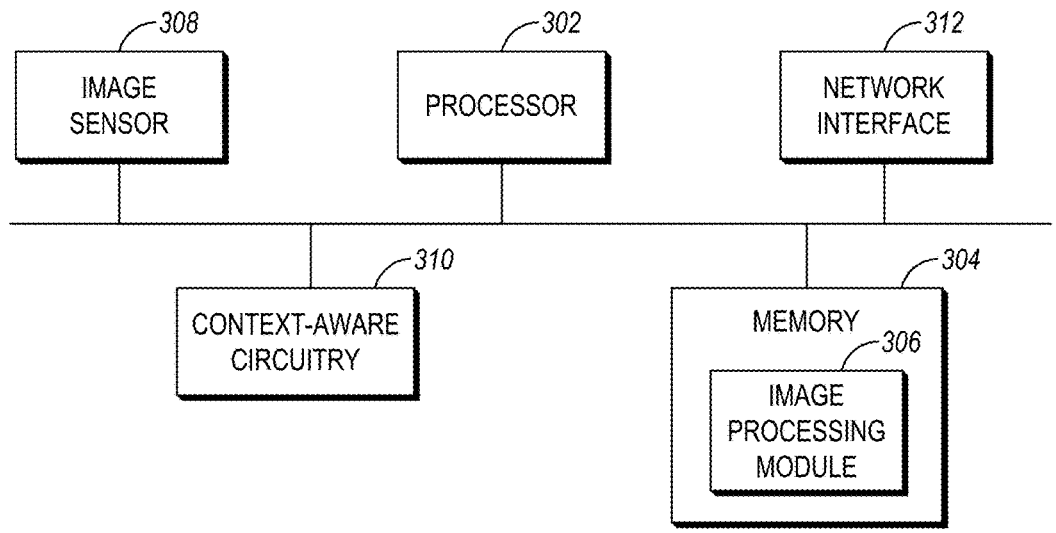
FIG. 3 is a block diagram of a video camera of the communication system of FIG. 2 in accordance with some embodiments of the present invention.

Referring now to FIG. 3, a block diagram is provided of video camera 202 in accordance with some embodiments of the present invention. Video camera 202 includes a processor 302 such as one or more microprocessors, microcontrollers, digital signal processors (DSPs), combinations thereof or such other devices known to those having ordinary skill in the art. Processor 302 may control the operation of video camera 202 according to data and instructions stored in an at least one memory device 304, such as random access memory (RAM), dynamic random access memory (DRAM), and/or read only memory (ROM) or equivalents thereof, that stores data and programs that may be executed by processor 302 so that the video camera may perform the functions described herein. At least one memory device 304 further includes an image processing module 306 comprising data and programs that, when executed by processor 302, are able to recognize a particular feature in a received image.

Video camera 202 further includes an image sensor 308 and context-aware circuitry 310 that are each coupled to processor 302. Image sensor 308 electronically captures a sequence of video frames (that is, a sequence of one or more still images), with optional accompanying audio, in a digital format. Although not shown, the images or video captured by image sensor 308 may be stored in the at least one memory device 304, or may be sent directly to server 220 via a network interface 312. Context-aware circuitry 310 may comprise any device capable of generating information used to determine a current Field-of-View (FOV). During operation, context-aware circuitry 310 provides processor 302 with information needed to determine a FOV. Processor 302 then determines a FOV and provides the FOV to server 220 via network interface 312. In a similar manner, processor 302 provides any image/video obtained by image sensor 308 to server 220 via network interface 312 for storage. However, in another embodiment of the present invention, video camera 202 may have recording capabilities, for example, video camera 202 may comprise a digital video recorder (DVR) wherein processor 302 stores images/video obtained by image sensor 308 in at least one memory device 304.

Figure 4:
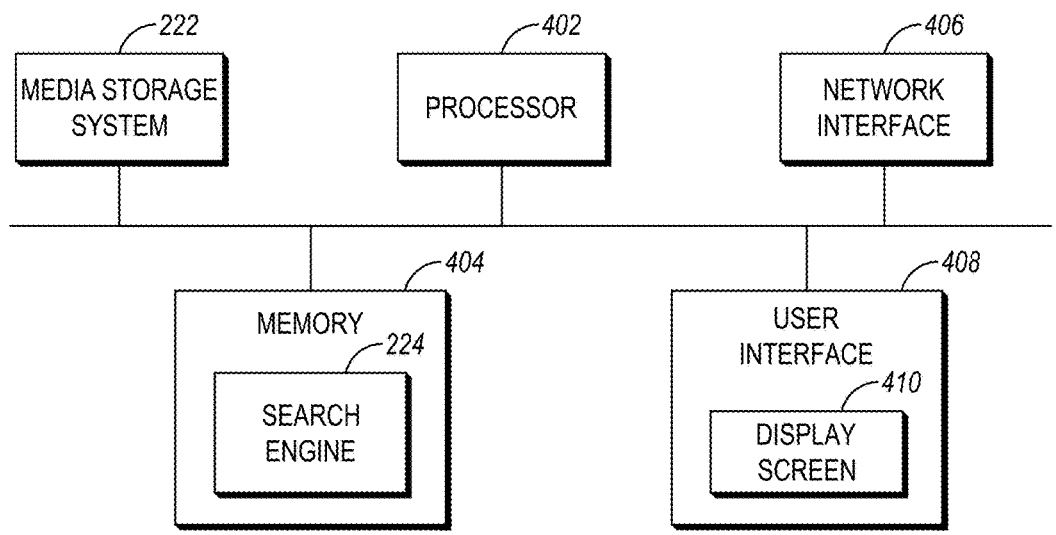
FIG. 4 is a block diagram of a server of the communication system of FIG. 2 in accordance with some embodiments of the present invention.

Referring now to FIG. 4, a block diagram is provided of server 220 in accordance with some embodiments of the present invention. Server 220 includes a processor 402 such as one or more microprocessors, microcontrollers, digital signal processors (DSPs), combinations thereof or such other devices known to those having ordinary skill in the art. Processor 402 may control the operation of server 220 according to data and instructions stored in an at least one memory device 404, such as random access memory (RAM), dynamic random access memory (DRAM), and/or read only memory (ROM) or equivalents thereof, that stores data and programs that may be executed by processor 402 so that the server may perform the functions described herein. The at least one memory device 404 further maintains a blur metric threshold that is used herein to determine whether a video frame is considered to be sharp or blurry. The blur metric threshold can be, for example, an absolute threshold applied to all video cameras of communication system 200 or can be determined by an operator of communication system 200 on a per-camera basis based on historical data for that camera, for example, based on images received from that camera that are considered too blurry to be of use.

Server 220 further includes media storage system 222, which media storage system is in communication with processor 402 and which media storage system stores video content captured, or downloaded, by video camera 202. The video content is stored in association with one or more attributes associated with the video content. However, in another embodiment of the present invention, media storage system 222 may be maintained in an infrastructure element external to, and accessible by, the server. At least one memory device 404 includes search engine 224 comprising data and programs that, when executed by processor 402, is able to search media storage system 222 based on the attributes associated with the video content.

The video content stored in media storage system 222 is stored in association with one or more attributes of the content. A video content attribute may be any descriptor of the content that may be searched by a database search engine. For example, such attributes may be: a 'source,' that is, an identifier of a source of the content (for example, an identifier of video camera 202); a 'camera location,' that is, a location associated with the video camera recording the content (for example, any one or combination of location parameters, such as a discrete location like a jewelry store and or an office building, a street address, a street intersection, or Global Positioning Satellite (GPS) coordinates); a 'frame number' associated with each video frame; and a 'recording time,' that is, a time of day and a date that the content was recorded or received by the server. Such attributes may be included in metadata that is included in a video stream sent to the server by the video camera. This list of attributes is provided to illustrate the principles of the present invention and is not intended to be a comprehensive listing of all attributes that may be associated with the video content.

Server 220 further includes one or more network interfaces 406 for connecting to data network 210 and, via the data network, to other devices of communication system 100, such as video camera 202. Additionally, server 220 may include a user interface 408 via which an operator may input data into the server. Each of the one or more network interfaces 406 and user interface 408 is coupled to processor 402. The one or more network interfaces 406 may include a wireless, a wireline, and/or an optical interface that is capable of conveying messaging, such as data packets, to, and receiving messaging from, the data network. User interface 408 includes a display screen 410 for displaying a data query and results of a corresponding data search, which display screen may or may not comprise a capacitive touchscreen, and further may include a keypad, buttons, a touch pad, a joystick, a mouse, an additional display, or any other device useful for providing an interface between a user and an electronic device such as server 220. Display screen 410 may be a liquid crystal display (LCD), a light emitting diode (LED) display, a plasma display, or any other means for visually displaying information.

Unless otherwise specified herein, the functionality described herein as being performed by video camera 202 and server 220 is implemented with or in software programs and instructions stored in the respective at least one memory device 304, 404 associated with the video camera and server and executed by the respective processor 302, 402 associated with the video camera and server. However, one of ordinary skill in the art realizes that the embodiments of the present invention alternatively may be implemented in hardware, for example, integrated circuits (ICs), application specific integrated circuits (ASICs), and the like, such as ASICs implemented in one or more of the video camera and server. Based on the present disclosure, one skilled in the art will be readily capable of producing and implementing such software and/or hardware without undo experimentation.

In order to control focus hunting by a remote video camera, such as video camera 202, communication system 200 provides a scheme for automated detection of, and resolution of, a focus hunt. More particularly, server 220 determines whether a predetermined number of blur metric transition cycles, associated with a video stream, have occurred within a predetermined period of time or within a predetermined number of frames and, in response to determining that the predetermined number of blur metric transition cycles has occurred, determines that focus hunt has occurred. A blur metric transition occurs when one blur metric of a first blur metric, determined for a first video frame of the video stream, and a second blur metric, determined for a second video frame of the video stream, is greater than a blur metric threshold and the other blur metric of the first blur metric and the second blur metric is less than the blur metric threshold. In turn, a blur metric transition cycle occurs when one blur metric transition, of a first blur metric transition and a second blur metric transition, comprises a transition from a blur metric that is less than the blur metric threshold to a blur metric that is greater than the blur metric threshold, and the other blur metric transition, of the first blur metric transition and the second blur metric transition, comprises a transition from a blur metric that is greater than the blur metric threshold to a blur metric that is less than the blur metric threshold.

For example, a blur metric comprises a determination whether an image present in one or more video frames is 'blurry' or 'sharp.' That is, the image may be determined to be blurry when a blur metric determined for the image is less than a blur metric threshold, and the image may be determined to be sharp when the blur metric determined for the image is greater than the blur metric threshold. In turn, a blur metric transition comprises a transition of the image from 'sharp-to-blurry' or from 'blurry-to-sharp' over a first plurality of video frames of a video stream. A blur metric transition cycle then comprises a transition of the image from 'sharp-to-blurry-to-sharp' or from 'blurry-to-sharp-to-blurry' over a second plurality of video frames of the video stream, wherein the second plurality of video frames includes the first plurality of video frames. When multiple such blur metric transition cycles occur within a given period of time, or within a given number of frames, then server 220 may determine that a video camera sourcing the video stream, such as video camera 202, is struggling to focus on the image and is undergoing focus hunt issues.

Figure 5:
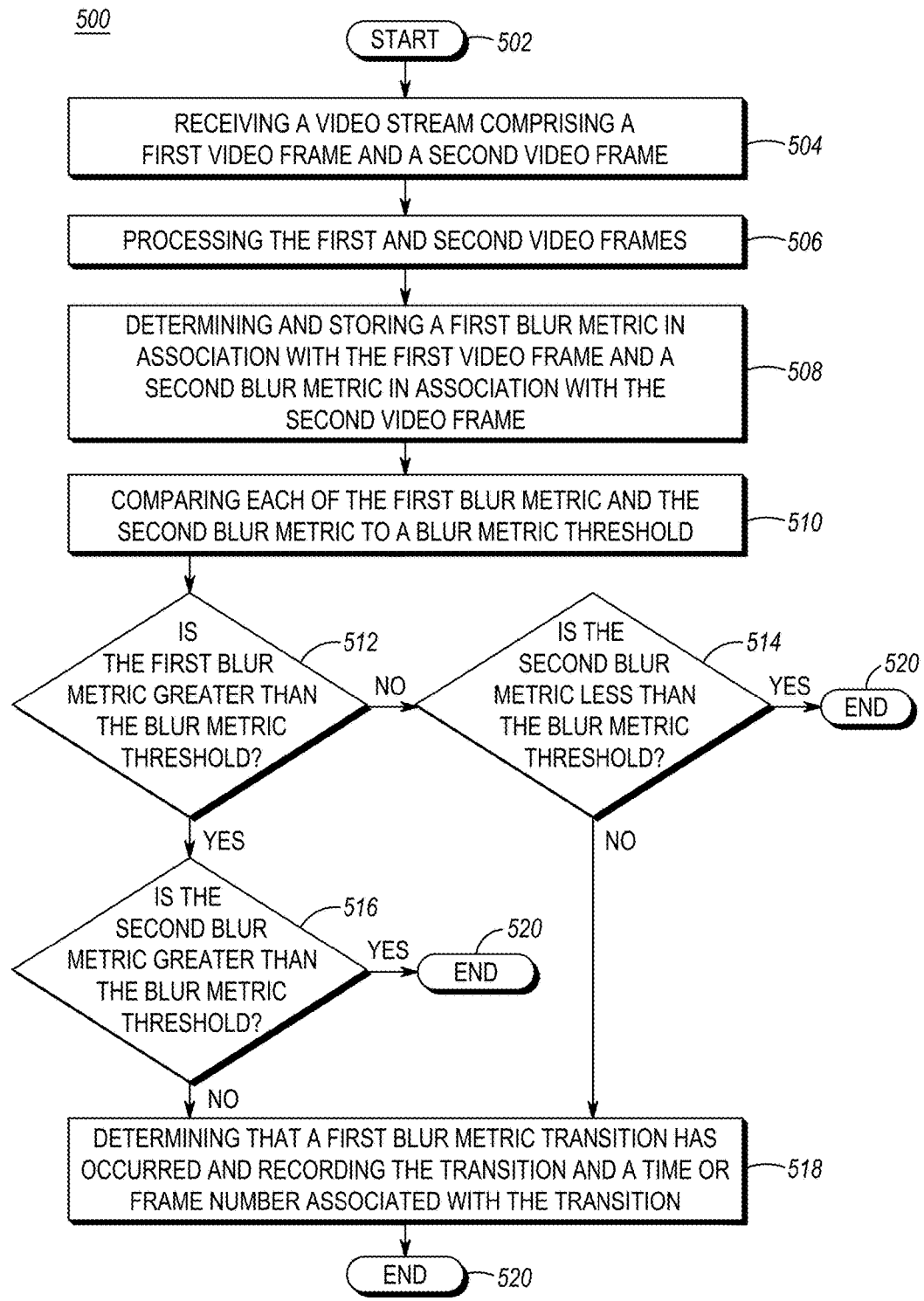
FIG. 5 is a logic flow diagram illustrating a method performed by communication system of FIG. 2 in determining blur metrics and whether a blur metric transition has occurred in association with a video stream, in accordance with some embodiments of the present invention.

Referring now to FIG. 5, a logic flow diagram 500 is provided that illustrates a method performed by communication system 200, and in particular by server 220, in determining blur metrics and whether a blur metric transition has occurred in accordance with some embodiments of the present invention. Logic flow diagram 500 begins (502) when server 220 receives (504) a video stream sourced by video camera 202, which video stream comprises multiple video frames, including a first video frame and a second video frame that is proximate, in time or frame number, to the first video frame. For example, the second video frame may immediately precede or succeed the first video frame, or the second video frame may be received within a first predetermined period of time or within a first predetermined number of frames of receipt of the first video frame.

In response to receiving the first video frame, server 220 processes (506) the first video frame, including generating a first time stamp associated with the first video frame and storing the first video frame, in association with the first time stamp and an identifier of the source of the first video frame, in media storage system 222. For example, video camera 202 may determine a time, that is, a first time, associated with the capturing of the first video frame and convey a time stamp, indicating the time that the first video frame was captured, to server 220. For example, video camera 202 may embed the time stamp in the metadata accompanying the first video frame or may otherwise attach the time stamp to the first video frame and convey the embedded or otherwise attached time stamp to server 220. The first time stamp, stored by server 220, may be the time stamp received from the video camera 202 along with the first video frame, or may be a time stamp determined by server 220 and associated with a time at which the server received the first video frame. Similarly, in response to receiving the second video frame, server 220 processes (506) the second video frame, including generating a second time stamp associated with the second video frame and storing the second video frame, in association with the second time stamp and an identifier of the source of the second video frame, in media storage system 222. Further processing of the video stream by server 220 then may occur in real time, as the video stream is received, or server 220 may store the video stream in media storage system 222 and further process the video stream at a later time.

In further processing of the video stream, and in particular of the first and second video frames, server 220 determines (508) a first blur metric for the first video frame and a second blur metric for the second video frame. Server 220 then may store, in at least one memory device 404, the first blur metric in association with the first video frame and the second blur metric in association with the second video frame. The blur metric determined for a video frame is a measurement of a blurriness, or conversely of a sharpness, of an image in the video frame. Many algorithms exist for calculating, that is, quantifying, a blurriness of an image and any such algorithm may be used herein. For example, various known algorithms include cumulative probability of blur detection (CPBD), which calculates a percentage of edges at which blur cannot be detected, discrete cosine transform (DCT) coefficients histograms, human visual system (HVS) modeling, and a probabilistic support vector machine (SVM) and perceptually motivated pooling.

In some embodiments of the present invention and to improve efficiency of the blur metric algorithm, the image may be scaled prior to applying the algorithm. Further, in some embodiments of the present invention and to improve efficiency of the algorithm, the image may be broken down into several sub-images, which could be processed in parallel and an overall blur metric, that is, video frame sharpness/blurriness, can derived from the sub-images (that is, by taking a weighted average of calculated sharpness/blurriness values based on a number of measured edges within the sub-image). Additionally, in some embodiments of the present invention and to improve efficiency of the blur metric algorithm, the blur metric may be determined based on an analysis of multiple video frames rather than a single frame. For example, the same image may be measured in each of multiple video frames, for example, in every '$n^{th}$' frame, and motion vectors may be used to predict changes in the image locations between these video frames to determine whether blurriness of the image may be due to motion of the image and not to camera focus. Thus, the blur metric algorithm may find or track a non-moving object, for example, a non-moving bright object such as an illuminated sign or window in a black and white image, across multiple video frames and then determine the blur metric with reference to the non-moving object.

In some embodiments of the present invention, in determining a blur metric for the first video frame, server 220 may determine whether to filter the first video frame before calculating a blur metric. For example, if a 'recording time' associated with the video frame indicates that the video frame was captured during daylight hours, then server 220 may determine that images captured in first video frame likely are sufficiently well defined such that a blur metric may be determined for an image without a filtering of the frame. However, if the 'recording time' associated with the video frame indicates that the video frame was captured during evening hours, then server 220 may determine that filtering of the images in first video frame is desirable in order to more clearly define the images before determining a blur metric.

In the event that server 220 determines to filter the first video frame, server 220 may determine the blur metric by filtering out color information associated with the first video frame and then analyzing black and white information associated with the first video frame. That is, typically a video stream comprises both a black and white video stream, or channel, and a color video stream, or channel. Further, the edges and sharpness of the captured images typically are more clearly defined in the black and white video stream than in the color video stream so by analyzing the black and white video stream, as opposed to the color video stream, edges and sharpness of the captured images may be more clearly defined. Therefore, server 220 may filter out color information and review only the black and white information, or channel. Server 220 then may detect the edges in the image, for example, by applying a known edge detection algorithm to the black and white image, detect bright areas in the image, for example, by applying a thresholding operation to the image, and then determine a blur metric by applying a known algorithm for quantifying a blur, as described above.

Referring again to FIG. 5, in response to determining the first blur metric (for the first video frame), server 220 compares (510) the first blur metric to the blur metric threshold maintained by the at least one memory device 404 of server 220. Further, in response to determining the second blur metric (for the second video frame), server 220 compares (510) the second blur metric to the blur metric threshold. Based on the comparisons of each of the first blur metric and the second blur metric to the blur metric threshold, server 220 determines (512, 514, 516) whether a blur metric transition has occurred with respect to the first and second video frames.

That is, server 220 determines whether one blur metric of the first blur metric and the second blur metric is less than the blur metric threshold and the other blur metric of the first blur metric and the second blur metric is greater than the blur metric threshold. If one of the blur metrics is less than the blur metric threshold and the other of the blur metrics is greater than the blur metric threshold, then server 220 determines (518) that a blur metric transition has occurred. From another perspective, server 220 determines whether the first blur metric (determined for the first video frame) and the second blur metric (determined for the second video frame) have transitioned from being less than the blur metric threshold to being greater than the blur metric threshold (that is, blurry-to-sharp) or have transitioned from being greater than the blur metric threshold to being less than the blur metric threshold (that is, sharp-to-blurry). If server 220 determines (518) that a blur metric transition has occurred, the server records, that is, stores in at least one memory device 404, the blur metric transition (blurry-to-sharp or sharp-to-blurry) and a time or frame number associated with the transition, for example, the time stamp associated with the first video frame.

More particularly, server 220 determines (512) whether the first blur metric is less than the blur metric threshold and further determines (514, 516), whether the second blur metric is less than the blur metric threshold. If both the first and second blur metrics are less than the blur metric threshold (512, 514), then server 220 may determine that an occurrence of a focus hunt by video camera 202 is not indicated and logic flow 500 ends (520). If both the first and second blur metrics are greater than the blur metric threshold (512, 516), then server 220 may determine that an occurrence of a focus hunt by video camera 202 is not indicated and logic flow 500 ends (520). However, if the first blur metric is less than the blur metric threshold and the second blur metric is greater than the blur metric threshold (512, 514) (that is, a 'blurry-to-sharp' transition), or the first blur metric is greater than the blur metric threshold and the second blur metric of the preceding video frame is less than the blur metric threshold (512, 516) (that is, a 'sharp-to-blurry' transition), then server 220 determines (518) that a 'blur metric transition' has occurred and an occurrence of a focus hunt by video camera 202 may be indicated. Logic flow 500 then ends (520).

Figure 6:
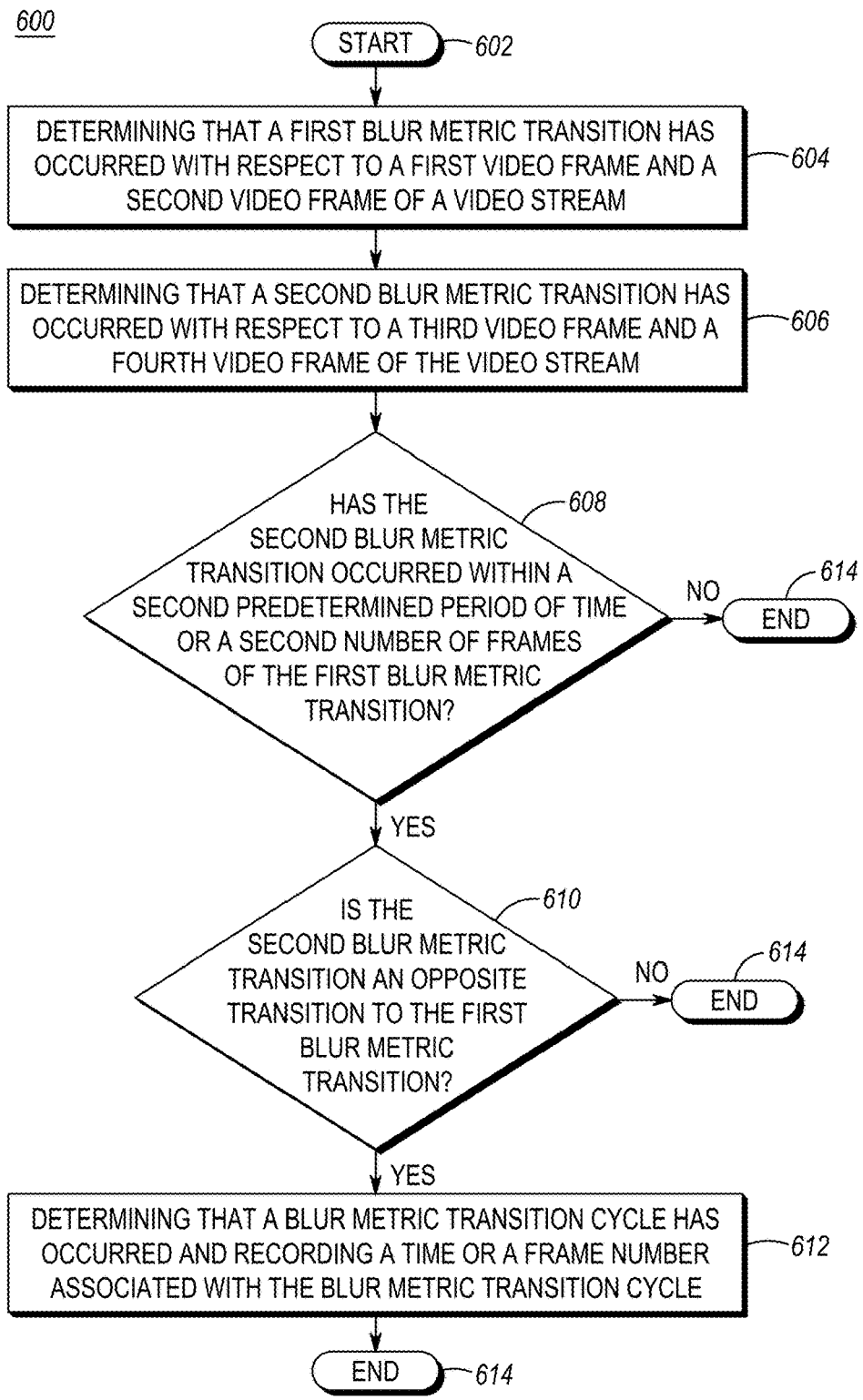
FIG. 6 is a logic flow diagram illustrating a method performed by communication system of FIG. 2 in determining whether a blur metric transition cycle has occurred in association with a video stream, in accordance with some embodiments of the present invention.

Referring now to FIG. 6, a logic flow diagram 600 is provided that illustrates a method performed by communication system 200, and in particular by server 220, in determining whether a 'blur metric transition cycle' has occurred in association with a video stream, based on a determination of multiple 'blur metric transitions,' in accordance with some embodiments of the present invention.

Logic flow diagram 600 begins (602) when server 220 determines (604, 606) an occurrence of multiple 'blur metric transitions' with respect to a video stream, wherein a determination of an occurrence of a blur metric transition is described above with respect to logic flow diagram 500. For example, server 220 determines (604) that a first blur metric transition has occurred with respect to first and second video frames of the video stream and determines (606) that a second blur metric transition has occurred with respect to third and fourth video frames of the video stream.

Server 220 further determines (608) whether the second blur metric transition has occurred within a second predetermined period of time, or a second predetermined number of video frames, of the first blur metric transition, and determines (610) whether the second blur metric transition is an opposite blur metric transition to the first blur metric transition. Two blur metric transitions are opposite blur metric transitions when one blur metric transition comprises a transition from a first state, such as blurry or sharp, to a second state, that is, sharp or blurry, respectively, and the other blur metric transition comprises a transition from the second state, that is, sharp or blurry, to the first state, that is, blurry or sharp, respectively.

The second blur metric transition may be prior to, subsequent to, or overlap with the first blur metric transition, and one of the third video frame and the fourth video frame may be a same video frame as one of the first video frame or the second video frame. Further, the second predetermined time period of time or the second predetermined number of frames is up to a designer of communication system 200 and should be such that the first and second blur metric transitions are sufficiently proximate to each other, in time, that a focus hunting situation is indicated when they are opposite transitions.

If server 220 determines, at step 608, that no second blur metric transition occurs within the second predetermined period of time, or the second predetermined number of frames, of the first blur metric transition, then server 220 may determine that an occurrence of focus hunt by video camera 220 is not indicated and logic flow 600 ends (614). Further, if server 220 determines, at step 610, that the second blur metric transition is not an opposite transition of the first blur metric transition, then server 220 may determine that an occurrence of focus hunt by video camera 220 is not indicated and logic flow 600 ends (614).

However, if server 220 determines, at step 608, that the second blur metric transition occurred within the second predetermined period of time, or the second predetermined number of frames, of the first blur metric transition and further determines, at step 610, that the second blur metric transition is an opposite transition of the first blur metric transition, then server 220 determines (612) that a 'blur metric transition cycle' has occurred and records, that is, stores in at least one memory device 404, a time or a frame number associated with the blur metric transition cycle. That is, when two blur metric transitions are opposite blur metric transitions, a blur metric transition cycle has occurred. For example, a blur metric transition cycle may be determined to have occurred when the first and second blur metric transitions together result in a 'blurry-to-sharp-to-blurry' transition cycle or a 'sharp-to-blurry-to-sharp' transition cycle. The time or frame number recorded in association with the blur metric transition cycle may be a time stamp, or a frame number, associated with any one or more of the first video frame, the second video frame, the third video frame, or the fourth video frame. Logic flow 600 then ends (614).

Figure 7:
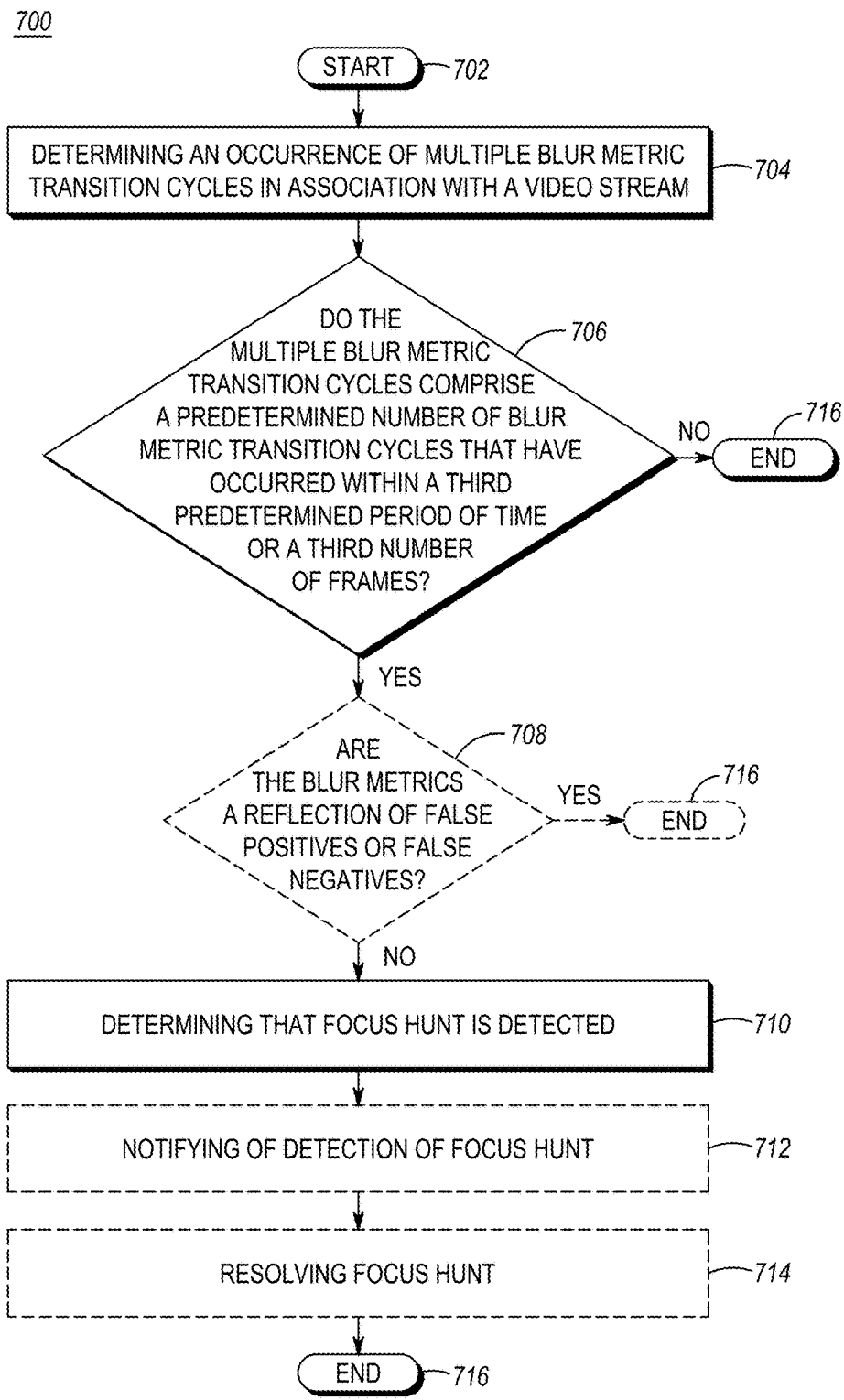
FIG. 7 is a logic flow diagram illustrating a method performed by communication system of FIG. 2 in determining whether focus hunting has occurred in association with a video stream, based on a determination of multiple blur metric transition cycles, in accordance with some embodiments of the present invention.

Referring now to FIG. 7, a logic flow diagram 700 is provided that illustrates a method performed by communication system 200, and in particular by server 220, in determining whether focus hunting has occurred in association with a video stream, based on a determination of multiple 'blur metric transition cycles,' in accordance with some embodiments of the present invention.

Logic flow diagram 700 begins (702) when server 220 determines (704), in association with the video stream, that multiple blur metric transition cycles have occurred, wherein a determination of an occurrence of a blur metric transition cycle is described above with respect to logic flow diagram 600. Server 220 further determines (706) whether the multiple blur metric transition cycles comprise a predetermined number (for example, 'N') of blur metric transition cycles, which predetermined number of blur metric transition cycles have occurred within a third predetermined period of time, or a third predetermined number of frames, of each other. The number ('N') of blur metric transition cycles, and the third predetermined time period of time or the third predetermined number of frames, is up to a designer of communication system 200 and should be such that the number ('N') of blur metric transition cycles is large enough, and the third predetermined time period of time or the third predetermined number of frames is small enough, to indicate that video camera 202 is unable to autofocus on objects within its FOV and that a focus hunting situation is indicated.

If the predetermined number of blur metric transition cycles has not occurred within the third predetermined period of time, or within the third predetermined number of frames, then server 220 may determine that an occurrence of focus hunt by video camera 202 has not occurred and logic flow 700 ends (716). However, if the predetermined number of blur metric transition cycles has occurred within the third predetermined period of time, or within the third predetermined number of frames, then server 220 may determine (710) that an occurrence of focus hunt by video camera 202 has been detected, and logic flow 700 then may end (716).

In some embodiments of the present invention, in response to detecting an occurrence of focus hunt by video camera 202, server 220 optionally may generate (712) a notification that focus hunt has been detected, for example, by generating an alert or a system alarm that identifies both the issue and video camera 202, and convey the notification to an operator of communication system 200. Further, in response to detecting an occurrence of focus hunt by video camera 202, server 220 optionally may attempt to resolve (714) the focus hunt by video camera 202, for example, by conveying an instruction to video camera 202 that manipulates a position of the video camera to achieve a steady focus state, for example, sending a pan-tilt-zoom (PTZ) command to re-adjust the camera's FOV to a view which doesn't trigger the focus hunt issue, conveying an instruction to the video camera to adjust the video camera's iris control, conveying an instruction to enable a wide dynamic range feature, or conveying an instruction to the video camera to disable automatic focus.

Further, in some embodiments of the present invention, prior to determining, at step 710, that focus hunt has been detected, server 220 optionally may determine (708) whether any of the determined blur metrics and corresponding blur metric transitions are a result of false positives or false negatives. In response to determining that a blur metric/blur metric transition is a result of a false positive or a false negative, server 220 may ignore the corresponding blur metric transition when determining whether focus hunt has been detected and/or determine that an occurrence of focus hunt is not indicated/detected. For example, based on metadata received in the video stream from video camera 202, server 220 may determine a setting of the iris of video camera 202 or the video camera's f-stop setting, as focus hunt issues are more likely at night when the iris is open to allow in more ambient light. By way of other examples, based on the video stream metadata, server 220 may track the video camera's focus setting over time to look for periodic mechanical movement of the camera, which could cause focus hunt, may determine a time of day when the images are captured as focus hunt issues are more likely at night when the iris is open and depth of field is shallow, may determine an average value of a quantizer being used to perform lossy video compression of the video stream, as a particularly high value may indicate that the video frames may be artificially blurred because of a de-blocking algorithm, may determine if one or more video packets are missing from the decoded video stream as the resulting error concealment may artificially blur the video, may determine if one or more objects are moving across the video at a high rate of speed, which could induce artificial motion blur, or may make sure that the background is stable when determining the blur metrics (excluding motion effect).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Furthermore, unless otherwise indicated herein, the use of relational terms, if any, such as first, second, third, and fourth, and the like are used solely to distinguish one entity or action, such as one frame, metric, or time period, from another entity or action without necessarily requiring or implying any actual such relationship or order between such entities or actions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for automated detection of focus hunt in association with a video stream, the method comprising:
   determining an occurrence of a plurality of blur metric transition cycles in association with the video stream, wherein determining an occurrence of each blur metric transition cycle of the plurality of blur metric transition cycles comprises:
      determining a plurality of blur metric transitions, wherein determining each blur metric transition of the plurality of blur metric transitions comprises determining a plurality of blur metrics in association with a plurality of video frames of the video stream, wherein a first blur metric of the plurality of blur metrics is greater than a blur metric threshold and a second blur metric of the plurality of blur metrics is less than the blur metric threshold; and
      wherein a blur metric transition cycle occurs wherein a first blur metric transition of the plurality of blur metric transitions comprises a transition from a blur metric that is less than the blur metric threshold to a blur metric that is greater than the blur metric threshold, and a second blur metric transition of the plurality of blur metric transitions comprises a transition from a blur metric that is greater than the blur metric threshold to a blur metric that is less than the blur metric threshold;
   determining a number of blur metric transition cycles of the plurality of blur metric transition cycles that occur within a predetermined period of time or within a predetermined number of frames; and
   determining that focus hunt has occurred based on the determined number of blur metric transition cycles.

2. The method of claim 1, further comprising:
   in response to determining that focus hunt has occurred, generating a notification that focus hunt has been detected.

3. The method of claim 1, further comprising:
   in response to determining that focus hunt has occurred, resolving the focus hunt.

4. The method of claim 3, wherein resolving the focus hunt comprises performing one or more of:
   conveying an instruction to a video camera that sourced the video stream that manipulates a position of the video camera to achieve a steady focus state;
   conveying, an instruction to the video camera to adjust the video camera's iris control;
   conveying an instruction to the video camera to enable a wide dynamic range feature; and
   conveying an instruction to the video camera to disable automatic focus.

5. The method of claim 1, wherein the predetermined period of time is a third predetermined period of time and the predetermined number of frames is a third predetermined number of frames, and wherein determining an occurrence of a blur metric transition cycle comprises determining that the first blur metric transition and the second blur metric transition occur within a second predetermined period of time or a second predetermined number of video frames of each other.

6. The method of claim 5, wherein determining a blur metric transition comprises determining that a first video frame, associated with the first blur metric, and a second video frame, associated with the second blur metric, are within a first predetermined period of time or a first predetermined number of video frames of each other.

7. The method of claim 1, wherein determining a plurality of blur metrics in association with a plurality of video frames comprises determining, for a video frame of the plurality of video frames, a blur metric by filtering out color information associated with the video frame and analyzing black and white information associated with the video frame.

8. The method of claim 1, wherein a blur metric transition comprises a transition of the image from sharp-to-blurry or from blurry-to-sharp over a plurality of video frames and wherein a blur metric transition cycle comprises a transition of the image from sharp-to-blurry-to-sharp or from blurry-to-sharp-to-blurry.

9. A server capable of detecting focus hunt in association with a video stream received from a remote video camera, the server comprising:
- a processor; and
- an at least one memory device that is configured to store a set of instructions that, when executed by the processor, cause the processor to perform the following functions:
  - determining an occurrence of a plurality of blur metric transition cycles in association with the video stream, wherein determining an occurrence of each blur metric transition cycle of the plurality of blur metric transition cycles comprises:
    - determining a plurality of blur metric transitions, wherein determining each blur metric transition of the plurality of blur metric transitions comprises determining a plurality of blur metrics in association with a plurality of video frames of the video stream, wherein a first blur metric of the plurality of blur metrics is greater than a blur metric threshold and a second blur metric of the plurality of blur metrics is less than the blur metric threshold; and
    - wherein a blur metric transition cycle occurs wherein a first blur metric transition of the plurality of blur metric transitions comprises a transition from a blur metric that is less than the blur metric threshold to a blur metric that is greater than the blur metric threshold, and a second blur metric transition of the plurality of blur metric transitions comprises a transition from a blur metric that is greater than the blur metric threshold to a blur metric that is less than the blur metric threshold;
  - determining a number of blur metric transition cycles of the plurality of blur metric transition cycles that occur within a predetermined period of time or within a predetermined number of frames; and
  - determining that focus hunt has occurred based on the determined number of blur metric transition cycles.

10. The server of claim 9, wherein the at least one memory device is configured to store a set of instructions that, when executed by the processor, cause the processor to:
- in response to determining that focus hunt has occurred, generating a notification that focus hunt has been detected.

11. The server of claim 9, wherein the predetermined period of time is a third predetermined period of time and the predetermined number of frames is a third predetermined number of frames, and wherein the at least one memory device is configured to store a set of instructions that, when executed by the processor, cause the processor to determine an occurrence of a blur metric transition cycle by determining that the first blur metric transition and the second blur metric transition occur within a second predetermined period of time or a second predetermined number of video frames of each other.

12. The server of claim 11, wherein the at least one memory device is configured to store a set of instructions that, when executed by the processor, cause the processor to determine a blur metric transition by determining that a first video frame, associated with the first blur metric, and a second video frame, associated with the second blur metric, are within a first predetermined period of time or a first predetermined number of video frames of each other.

13. The server of claim 9, wherein the at least one memory device is configured to store a set of instructions that, when executed by the processor, cause the processor to determine a plurality of blur metrics in association with a plurality of video frames by determining, for a video frame of the plurality of video frames, a blur metric by filtering out color information associated with the video frame and analyzing black and white information associated with the video frame.

14. The server of claim 9, wherein the at least one memory device is configured to store a set of instructions that, when executed by the processor, cause the processor to determine a blur metric by determining whether an image present in one or more video frames is blurry or sharp.

15. The server of claim 14, wherein a blur metric transition comprises a transition of the image from sharp-to-blurry or from blurry-to-sharp over a plurality of video frames and wherein a blur metric transition cycle comprises a transition of the image from sharp-to-blurry-to-sharp or from blurry-to-sharp-to-blurry.

* * * * *